United States Patent
Iyer

(10) Patent No.: US 9,078,192 B2
(45) Date of Patent: Jul. 7, 2015

(54) BALANCING CLIENTS ACROSS BANDS IN A SINGLE ACCESS POINT

(75) Inventor: Pradeep J. Iyer, Cupertino, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 614 days.

(21) Appl. No.: 12/609,981

(22) Filed: Oct. 30, 2009

(65) Prior Publication Data

US 2011/0103230 A1    May 5, 2011

(51) Int. Cl.
*H04W 48/06* (2009.01)

(52) U.S. Cl.
CPC .................... *H04W 48/06* (2013.01)

(58) Field of Classification Search
CPC ....... H04L 47/10; H04L 47/14; H04L 47/125; H04W 36/00; H04W 48/06
USPC .............. 370/229, 230, 230.1, 231, 235, 241, 370/464, 465; 379/1.01, 32.01, 32.04; 455/403, 422.1, 450, 452.1, 453, 455
See application file for complete search history.

(56) References Cited

U.S. PATENT DOCUMENTS

| | | | |
|---|---|---|---|
| 5,886,988 A * | 3/1999 | Yun et al. | 370/329 |
| 6,377,548 B1 * | 4/2002 | Chuah | 370/233 |
| 2004/0039817 A1 * | 2/2004 | Lee et al. | 709/225 |
| 2004/0208126 A1 * | 10/2004 | Wassew et al. | 370/235 |
| 2004/0224709 A1 * | 11/2004 | Yi et al. | 455/515 |
| 2005/0233753 A1 * | 10/2005 | Hamabe et al. | 455/452.1 |
| 2006/0089166 A1 * | 4/2006 | Nagano et al. | 455/515 |
| 2006/0105773 A1 * | 5/2006 | Lin et al. | 455/452.1 |
| 2006/0234719 A1 * | 10/2006 | Demirhan et al. | 455/453 |
| 2007/0054645 A1 * | 3/2007 | Pan | 455/266 |
| 2008/0075053 A1 * | 3/2008 | Soneda | 370/338 |
| 2008/0096504 A1 * | 4/2008 | Linkola et al. | 455/187.1 |
| 2008/0198811 A1 * | 8/2008 | Deshpande et al. | 370/332 |
| 2009/0016276 A1 * | 1/2009 | Kim | 370/329 |
| 2009/0154416 A1 * | 6/2009 | Lu et al. | 370/329 |

* cited by examiner

*Primary Examiner* — Obaidul Huq
(74) *Attorney, Agent, or Firm* — Ying Yang

(57) ABSTRACT

Balancing client load on an access point in a wireless digital network. An access point tracks the number of connected users and accepts new connections only if the number of connected users is below a preset threshold. The number of connected users may be tracked on an access point wide basis, a per-band basis, a per-BSSID basis, or a combination. Similarly, accepting new connections may be done on an access point wide basis, a per-band basis, a per-BSSID basis, on the basis of client 802.11 capabilities, or a combination.

24 Claims, 1 Drawing Sheet

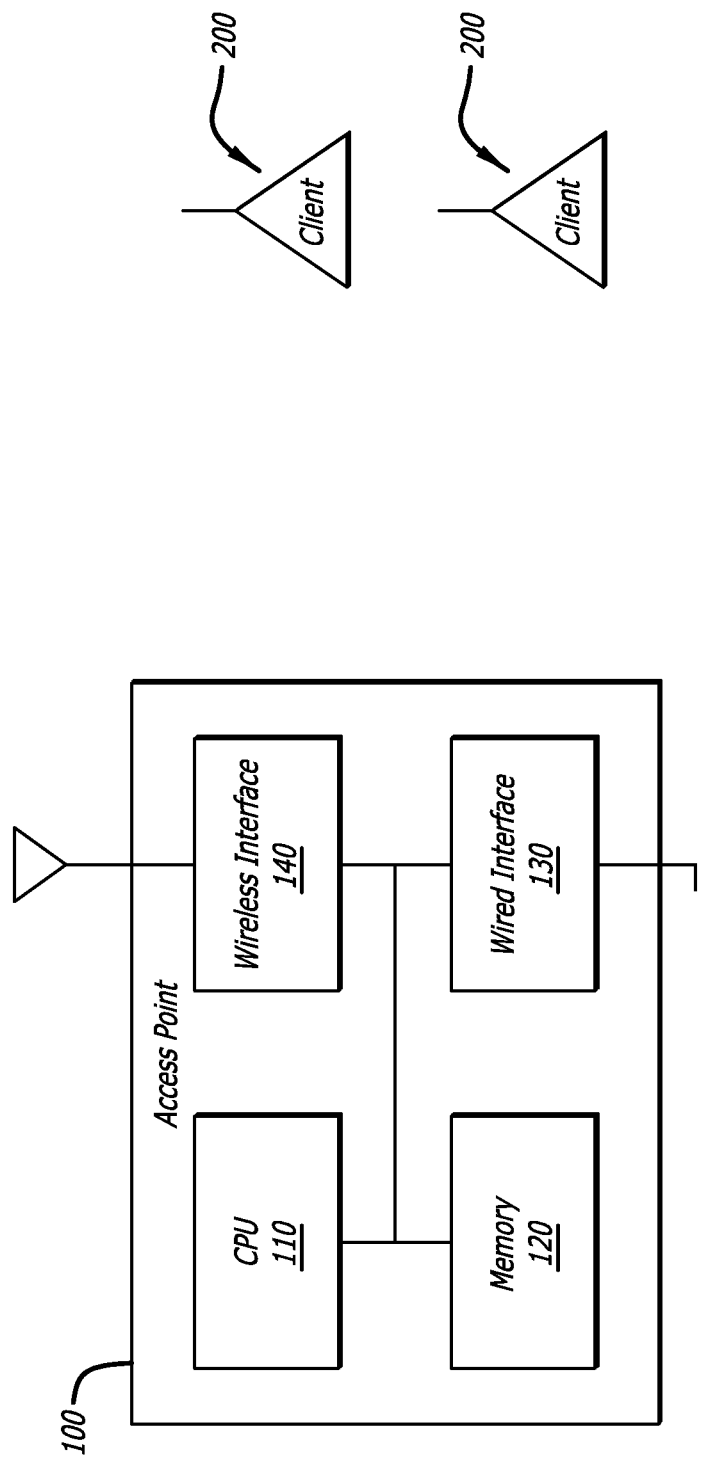

BALANCING CLIENTS ACROSS BANDS IN A SINGLE ACCESS POINT

BACKGROUND OF THE INVENTION

The present invention relates to wireless digital networks, and in particular, to the problem of balancing client load across bands in an access point in a wireless digital network.

Wireless digital networks commonly have a controller to which are attached one or more access points. Each access point supports a number of wireless clients. In most situations, each access point (AP) connects to its controller using a wired connection, for example using 803.2 Ethernet.

An access point may advertise multiple services (SSIDs) on different bands. As an example, IEEE802.11 wireless networks in the United States may operate on channels on the 2.4 GHz and 5 GHz bands, advertising services to wireless clients on each band.

The resources in a access point in a single band are limited. If an access point accepts too many client connections, it may not have the resources needed to adequately service all those clients. Typically, client devices do not have a sense of the load on an individual access point, or the load on a particular band on an access point. Client devices commonly choose an access point to associate with based on reported signal strength, often choosing the access point with the strongest signal.

What is needed is a mechanism for balancing client load across different bands in a single access point.

BRIEF DESCRIPTION OF THE DRAWINGS

The invention may be best understood by referring to the following description and accompanying drawings that are used to illustrate embodiments of the invention in which:

FIG. 1 shows an access point in a wireless network.

DETAILED DESCRIPTION

Embodiments of the invention relate to methods of balancing client load in a single access point (AP) in a wireless network. In an embodiment of the invention an AP in a wireless network advertises services on one or more bands. The access point keeps track of the number of wireless clients connected to it. As wireless clients attempt to connect to the access point, the access point checks the number of connected clients and only allows new connections if the number of wireless clients currently connected to the access point is below a threshold. The access point will not respond to Probe Requests from unconnected clients, and will respond to Authentication Requests from new clients with an error response if the access point is overloaded. The determination of connected clients being below a threshold to allow new connections may be made on an overall access point basis, on a per-band basis, a per-BSSID basis, or a combination. The determination can also be made based on client capabilities advertized by the client in a Probe Request frame allowing 802.11n clients on the 5 GHz band and keeping legacy non 802.11n capable clients in 2.4 GHz band.

FIG. 1 shows a network in which access point 100 supports wireless clients 200a, 200b.

Access point 100 is a purpose-built digital devices having a CPU 110, memory hierarchy 120, a first wired interface 130, and wireless interface 140. The CPU 110 commonly used for such access nodes is a MIPS-class CPU such as one from Raza Microelectronics or Cavium Networks, although processors from other vendors such as Intel, AMD, Freescale, and IBM may be used. Memory hierarchy 120 comprises read-only storage such as ROM or EEPROM for device startup and initialization, fast read-write storage such as DRAM for holding operating programs and data, and permanent bulk file storage such as compact flash memory. Memory hierarchy 120 may also contain a TPM. Access point 100 typically operates under control of purpose-built programs running on an embedded operating system such as Linux or VXWorks. Wireless interface 140 is typically an interface operating to the family of IEEE 802.11 standards including but not limited to 802.11a, b, g, and/or n. A typical access point may have multiple wireless interfaces 140, for example, one wireless interface providing services on the 2.4 GHz band, and one wireless interface 140 providing services on the 5 GHz band.

In operation access point 100 advertises services on each band in which it operates by advertising services through one or more broadcast BSSIDs. Access point 100 responds to Probe Requests from client devices 200, Authentication Requests and Association Request from client devices 200 enable client devices 200 to connect to the access point.

Client devices typically select an access point from a set of available access points based on signal strength. This can lead to the overloading of one access point in an area, as clients connect to the highest signal strength provider. Signal Strength is generally stronger in 2.4 GHz band and clients tend to favor connecting on that band.

According to the present invention, access point 100 keeps track of the number of users connected to it. If access point 100 is overloaded, based on the number of users connected to it, the access point will not accept new connection requests.

Not accepting connection requests means for example that access point 100 will only respond to Probe Requests if it is not overloaded. Conversely, the access point will not respond to Probe Requests when overloaded. In normal, non-overloaded operation, access point 100 responds to Authentication Requests with an Authentication Response. When overloaded, access point 100 responds to Authentication Requests with an Authentication Response containing an error code, rejecting the request. In normal, non-overloaded operation, access point 100 responds to Association Request with an Association Response containing a success code. When overloaded, access point 100 responses to an Association Response with an error code, rejecting the request.

In one embodiment of the invention, access point 100 makes the decision of being overloaded or not being overloaded based on the number of users connected on each band. As an example, for a dual-band access point providing services on both 2.4 GHz and 5 GHz bands, the access point may have a limit of 20 connected clients using a 20 MHz wide channel on the 2.4 GHz band, and 45 connected clients using a 40 MHz wide channel on the 5 GHz band. Once the access point has its maximum number of connections on the 5 GHz band, it will stop accepting connection requests on the 5 GHz band, but may still respond to connection requests on the 2.4 GHz band if that band is not overloaded. If the access point has its maximum number of connections on the 2.4 GHz band, it will stop accepting connection requests on that band, but may accept connection requests on the 5 GHz band if the access point is not overloaded on that band.

In another embodiment of the invention, these rules may be combined.

In another embodiment of the invention, access point 100 may make the decision of being overloaded or not overloaded on a per-band and per-BSSID basis. As an example, an access point may support voice-over-IP (VOIP) services on the 2.4 GHz band through a particular BSSID. According to the present invention, the access point may only allow a certain number of client connections to that BSSID before it will stop accepting connection requests. The access point may stop accepting connection requests just to that BSSID, on that band, or to the access point entirely.

As an example, in an embodiment of the invention, if an access point has accepted clients on one BSSID, such as a 2.4 GHz VOIP BSSID, the access point may only accept new connection requests on the 5 GHz band until a further threshold is reached.

In another embodiment of the invention, access point 100 may make the decision of being overloaded or not on parameters such as client 802.11 capabilities. As an example, an access point may only accept new high throughput connections, such as IEEE802.11n connections until a maximum number of such connections is reached. Such capabilities are generally advertized in Probe Request sent by the client to the Access Point.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following:
a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer implemented method, comprising:
   tracking, by a network device, a first load associated with usage of a first wireless communication band, wherein the first wireless communication band is used for client connections;
   tracking a second load associated with usage of a second wireless communication band, wherein the second wireless communication band is used for client connections;
   receiving a client connection request on the first wireless communication band;
   responding to the client connection request on the first wireless communication band when the first load is less than a first threshold;
   rejecting the client connection request on the first wireless communication band when the first load is greater than or equal to the first threshold;
   responding to additional client connection requests on the second wireless communication band when the second load is less than a second threshold; and
   continuing to reject additional client connection requests on the first wireless communication band when the first load is greater than or equal to the first threshold.

2. The method of claim 1, wherein the first load corresponds to a number of connected clients on the first wireless communication band and wherein the second load corresponds to a number of connected clients on the second wireless communication band.

3. The method of claim 1, wherein the first threshold corresponds to a maximum number of connected clients on the first wireless communication band and wherein the second threshold corresponds to a maximum number of connected clients on the second wireless communication band.

4. The method of claim 1, wherein tracking the first load associated with usage of the first wireless communication band includes tracking usage of the first wireless communication band by BSSID.

5. The method of claim 1, wherein responding to a connection request includes responding to the connection request on a per-BSSID basis.

6. The method of claim 1, wherein responding to a connection request includes authorizing the connection request.

7. The method of claim 1, wherein rejecting a connection request includes transmitting an error message.

8. The method of claim 1, further comprising:
   receiving a second client connection request on the second wireless communication band;
   responding to the second client connection request on the second wireless communication band when the second load is less than the second threshold, wherein the second threshold is different from the first threshold; and
   rejecting the second client connection request on the second wireless communication band when the second load is greater than or equal to the second threshold.

9. A system comprising:
   one or more processors; and
   a non-transitory computer readable storage medium communicatively coupled to the one or more processors, wherein the non-transitory computer readable storage medium includes instructions that, when executed by the one or more processors, cause the one or more processors to perform operations including:
   tracking a first load associated with usage of a first wireless communication band at a network device, wherein the first wireless communication band is used for client connections;
   tracking a second load associated with usage of a second wireless communication band at the network device, wherein the second wireless communication band is used for client connections;
   receiving a client connection request on the first wireless communication band;
   responding to the client connection request on the first wireless communication band when the first load is less than a first threshold;
   rejecting the client connection request on the first wireless communication band when the first load is greater than or equal to the first threshold;
   responding to additional client connection requests on the second wireless communication band when the second load is less than a second threshold; and
   continuing to reject additional client connection requests on the first wireless communication band when the first load is greater than or equal to the first threshold.

10. The system of claim 9, wherein the first load corresponds to a number of connected clients on the first wireless communication band and wherein the second load corresponds to a number of connected clients on the second wireless communication band.

11. The system of claim 9, wherein the first threshold corresponds to a maximum number of connected clients on the first wireless communication band and wherein the second threshold corresponds to a maximum number of connected clients on the second wireless communication band.

12. The system of claim 9, wherein tracking the first load associated with usage of the first wireless communication band includes tracking usage of the first wireless communication band by BSSID.

13. The system of claim 9, wherein responding to a connection request includes responding to the connection request on a per-BSSID basis.

14. The system of claim 9, wherein responding to a connection request includes authorizing the connection request.

15. The system of claim 9, wherein rejecting a connection request includes transmitting an error message.

16. The system of claim 9, further comprising:
receiving a second client connection request on the second wireless communication band;
responding to the second client connection request on the second wireless communication band when the second load is less than the second threshold, wherein the second threshold is different from the first threshold; and
rejecting the second client connection request on the second wireless communication band when the second load is greater than or equal to the second threshold.

17. A non-transitory computer readable medium comprising instructions that, when executed by one or more processors, cause the one or more processors to perform operations including:
tracking a first load associated with usage of a first wireless communication band at a network device, wherein the first wireless communication band is used for client connections;
tracking a second load associated with usage of a second wireless communication band at the network device, wherein the second wireless communication band is used for client connections;
receiving a client connection request on the first wireless communication band;
responding to the client connection request on the first wireless communication band when the first load is less than a first threshold;
rejecting the client connection request on the first wireless communication band when the first load is greater than or equal to the first threshold;
responding to additional client connection requests on the second wireless communication band when the second load is less than a second threshold; and
continuing to reject additional client connection requests on the first wireless communication band when the first load is greater than or equal to the first threshold.

18. The non-transitory computer readable medium of claim 17, wherein the first load corresponds to a number of connected clients on the first wireless communication band and wherein the second load corresponds to a number of connected clients on the second wireless communication band.

19. The non-transitory computer readable medium of claim 17, wherein the first threshold corresponds to a maximum number of connected clients on the first wireless communication band and wherein the second threshold corresponds to a maximum number of connected clients on the second wireless communication band.

20. The non-transitory computer readable medium of claim 17, wherein tracking the first load associated with usage of the first wireless communication band includes tracking usage of the first wireless communication band by BSSID.

21. The non-transitory computer readable medium of claim 17, wherein responding to a connection request includes responding to the connection request on a per-BSSID basis.

22. The non-transitory computer readable medium of claim 17, wherein responding to a connection request includes authorizing the connection request.

23. The non-transitory computer readable medium of claim 17, wherein rejecting a connection request includes transmitting an error message.

24. The non-transitory computer readable medium of claim 17, wherein the operations further include:
receiving a second client connection request on the second wireless communication band;
responding to the second client connection request on the second wireless communication band when the second load is less than the second threshold, wherein the second threshold is different from the first threshold; and
rejecting the second client connection request on the second wireless communication band when the second load is greater than or equal to the second threshold.

* * * * *

UNITED STATES PATENT AND TRADEMARK OFFICE
CERTIFICATE OF CORRECTION

| | | |
|---|---|---|
| PATENT NO. | : 9,078,192 B2 | Page 1 of 1 |
| APPLICATION NO. | : 12/609981 | |
| DATED | : July 7, 2015 | |
| INVENTOR(S) | : Pradeep J. Iyer | |

It is certified that error appears in the above-identified patent and that said Letters Patent is hereby corrected as shown below:

On the title page item (74), Attorney, in column 2, line 1, delete "Ying Yang" and insert -- Ying Wang --, therefor.

Signed and Sealed this
Ninth Day of February, 2016

Michelle K. Lee
*Director of the United States Patent and Trademark Office*